(12) United States Patent
Kozlovski

(10) Patent No.: US 6,879,301 B2
(45) Date of Patent: Apr. 12, 2005

(54) APPARATUS AND ARTICLES OF MANUFACTURE FOR AN AUTOMOTIVE ANTENNA MOUNTING GASKET

(75) Inventor: Albert David Kozlovski, Atkinson, NH (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/435,243

(22) Filed: May 9, 2003

(65) Prior Publication Data

US 2003/0197649 A1 Oct. 23, 2003

Related U.S. Application Data

(63) Continuation-in-part of application No. 09/972,807, filed on Oct. 9, 2001, now Pat. No. 6,762,727.

(51) Int. Cl.[7] .............................. H01Q 1/12; H01Q 1/32
(52) U.S. Cl. ........................................ 343/878; 343/715
(58) Field of Search ................................ 343/713, 715, 343/878, 888, 898; 277/606, 628, 647

(56) References Cited

U.S. PATENT DOCUMENTS 6,714,171 B2 * 3/2004 Haussler et al. ............ 343/888

FOREIGN PATENT DOCUMENTS

| FR | 2 575 427 | 7/1986 | ........... B60R/11/00 |
| WO | WO 00/35046 | 6/2000 | ............ H01Q/1/12 |
| WO | WO 03/032436 A1 | 4/2003 | ............ H01Q/1/32 |

* cited by examiner

Primary Examiner—Michael C. Wimer

(57) ABSTRACT

A waterproof automotive antenna mounting assembly gasket comprises a base having a plurality of apertures and a mounting hole disposed therein, a generally sloped outer casing extending upward from the base, an inner casing connected along a bottom portion of the outer casing and positioned interior to the outer casing, a gap positioned between the bottom portion of the inner casing and the base, a plurality of compressible tabs extending inwardly from the inner casing and aligned with the apertures in the base, a channel disposed in between the inner and outer casings, a plurality of gripping members disposed on an underside of the base, a sealing interface disposed on the base, and an anti-rotation hole disposed on the base. The upper portion of the inner casing extends beyond the upper portion of the outer casing. The anti-rotation hole aligns with a corresponding hole attached to a secondary surface.

26 Claims, 6 Drawing Sheets

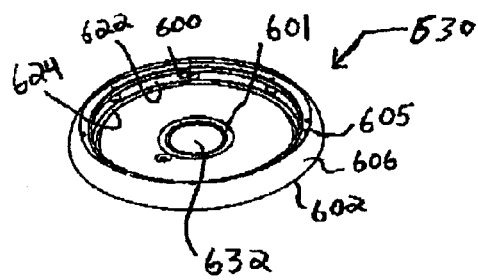
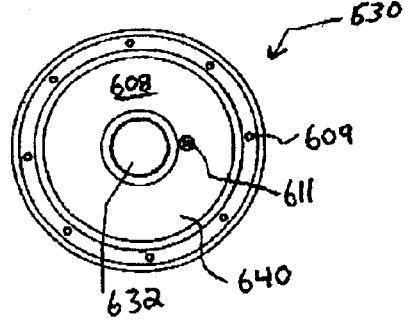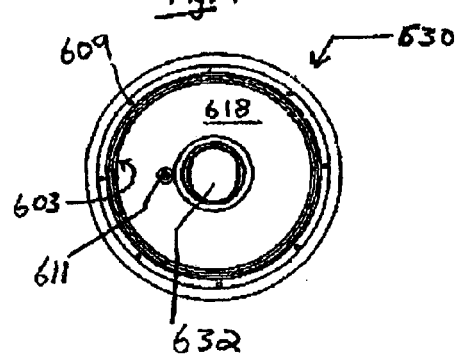
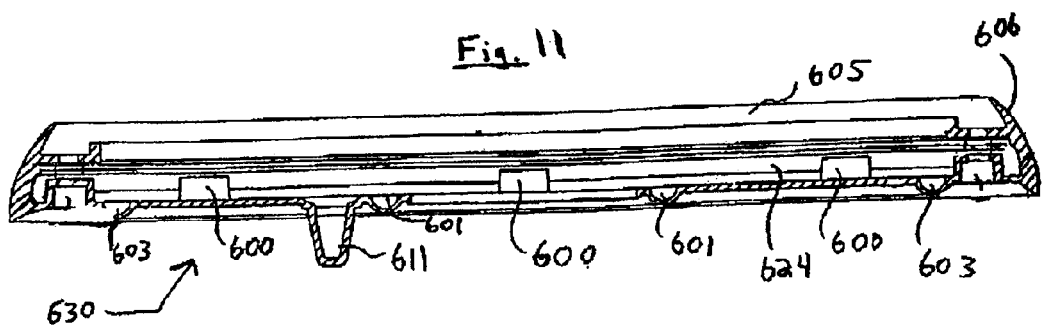

APPARATUS AND ARTICLES OF MANUFACTURE FOR AN AUTOMOTIVE ANTENNA MOUNTING GASKET

CROSS-REFERENCE TO RELATED APPLICATIONS

This application is a continuation-in-part of U.S. patent application Ser. No. 09/972,807, filed Oct. 9, 2001, now U.S. Pat. No. 6,762,727 entitled "Quick-Attach Automotive Antenna Mounting Assembly", the complete disclosure of which is herein incorporated by reference.

FIELD OF THE INVENTION

The present invention generally relates to mounting systems, and more particularly to gaskets.

BACKGROUND OF THE INVENTION

In many situations, it is necessary to attach a device to a panel or other support structure. One example is the attachment of an antenna, such as a Global Positioning System (GPS) antenna or cellular antenna to an automobile roof or trunk lid. When such devices are installed on an assembly line, it is important that the device can be accurately and quickly secured to the panel. It is also important that the device be self-contained, so as to eliminate the need for multiple parts or two-handed (or multiple person) operation to install the device. Further, it is important that the installation be as simple as possible with few operational steps. In some applications, there is an additional requirement that the device be properly oriented relative to the panel. Moreover, it is generally required that the device being secured to the panel have a seal impregnable to water, dust, and other elements capable of causing the device to become dislodged due to weathering of its parts.

There are numerous known apparatus and processes to attach a device to a panel. In most of those known procedures, the use of both hands, or multiple people, is required for the installation because the device is positioned on one side of the panel and the fastening means is operated from the opposite side of the panel. In addition, most installations of known devices require multiple steps, or the apparatus involves the use of many, often small parts, such as nuts, washers, bolts, screws, or the like. These deficiencies result in a time consuming and awkward installation. Furthermore, the conventional devices are often deficient with regard to proper sealing, and often allow water, dust, and debris to cause the device to detach prematurely.

Additionally, there are known gaskets used in combination with attachment devices. However, conventional gaskets require significantly more force between it and the sealing surface of a panel in order to achieve a seal. Often, this results in distortion of the sealing surface thereby causing difficulty in achieving a proper and complete seal. Moreover, these conventional gaskets are very limited on how much surface contour could be absorbed by the gasket and still achieve a seal. Therefore, there is a need for a novel flexible gasket allowing a greater range of surface contour to occur while still maintaining seal integrity.

SUMMARY OF THE INVENTION

Embodiments of the present invention comprise a mounting gasket adapted for an automotive antenna mounting assembly.

According to one embodiment of the invention, a waterproof automotive antenna mounting assembly gasket comprising a base portion, a sealing edge extending from the base portion, an inner lip positioned proximally to the sealing edge, a gap configured between the sealing edge and the inner lip, a mounting hole configured in the base portion, an anti-rotation member configured in the base portion, a plurality of holes disposed through the base portion, and a plurality of sealing members on the base portion, wherein the sealing members are dimensioned and configured to seal the gasket with a secondary surface.

In an exemplary embodiment, a generally V-shaped gasket is provided comprising a base having a plurality of apertures and a mounting hole disposed therein, a generally sloped outer casing extending upward from the base, an inner casing connected along a bottom portion of the outer casing and positioned interior to the outer casing, a gap positioned between the bottom portion of the inner casing and the base, a plurality of compressible tabs extending inwardly from the inner casing and aligned with the apertures in the base, a channel disposed in between the inner and outer casings, a plurality of gripping members disposed on an underside of the base, a sealing interface disposed on the base, and an anti-rotation member, such as a hole, disposed on the base. The upper portion of the inner casing may extend beyond the upper portion of the outer casing. The anti-rotation member may align with a corresponding hole attached to a secondary surface.

In another embodiment, a generally circular gasket is provided comprising a base portion having an upper surface and a lower surface. A sealing edge extends from the base portion, wherein the sealing edge includes a generally sloping outer surface and an upper lip positioned above the base portion. The upper lip is configured to include a plurality of holes spaced therethrough. The gasket further includes an inner lip extending from the base portion and positioned below the upper lip, wherein the inner lip is configured to include a plurality of apertures spaced therethrough. Additionally, a slot is configured between the upper lip and the inner lip. Moreover, a mounting hole is configured in the base portion and is encircled by a generally raised interface bump. The holes in the upper lip are positioned such that they are aligned over the apertures in the inner lip. The gasket further comprises a plurality of sealing interface members located on the underside surface of the base portion, wherein the sealing members being dimensioned and configured to seal the gasket with a secondary surface, such as a panel. The gasket also includes a preferably conical finger member extending from the underside of the base portion, wherein the finger member is generally hollow.

An exemplary embodiment of a gasket according to the present invention provides for both internal sealing and mounting sealing via a single gasket device.

The present invention provides several various embodiments of a gasket that overcome several disadvantages of conventional designs; for example, a mounting gasket having a greater range of surface contour while still maintaining seal integrity, a gasket requiring low installation forces necessary to achieve a satisfactory seal with a corresponding panel, a gasket assuring that minimal, and preferably no leakage occurs through the sealing surface and/or a gasket providing for a more reliable, more aesthetically pleasing, and lower cost seal than conventional gaskets.

BRIEF DESCRIPTION OF THE DRAWINGS

The foregoing will be better understood from the following detailed description of the invention with reference to the drawings, in which:

FIG. 8 is a perspective view of an alternative embodiment of a gasket used in combination with the attachment assembly of FIG. 1;

FIG. 9 is a top plan view of the gasket of FIG. 8;

FIG. 10 is a bottom plan view of the gasket of FIG. 8; and;

FIG. 11 is a partial cross-sectional view of the gasket of FIG. 8.

DETAILED DESCRIPTION OF THE INVENTION

Figure 1:
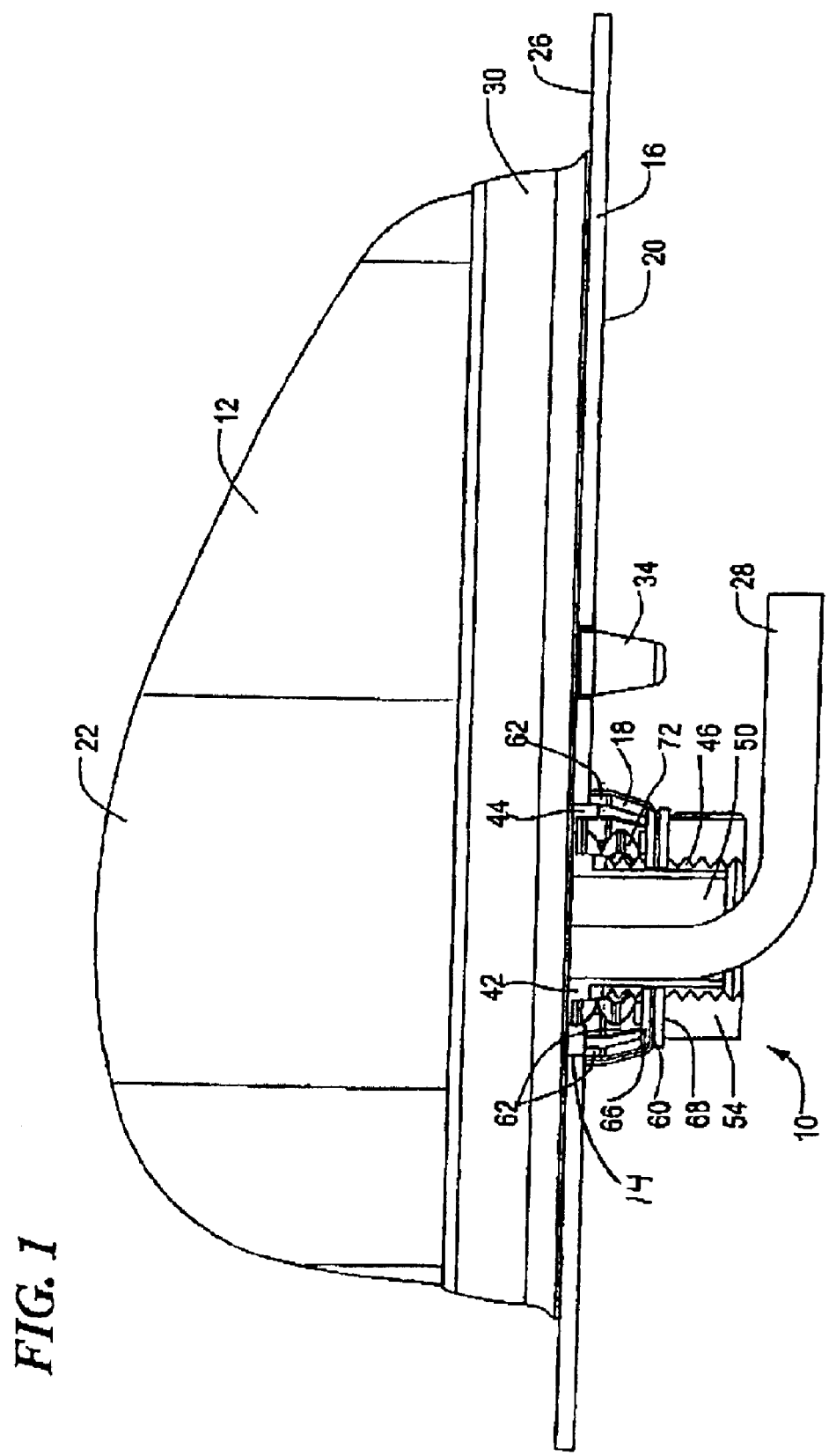
FIG. 1 is a side view of an automotive attachment assembly in conjunction with an antenna unit according to the present invention.
Figure 2:
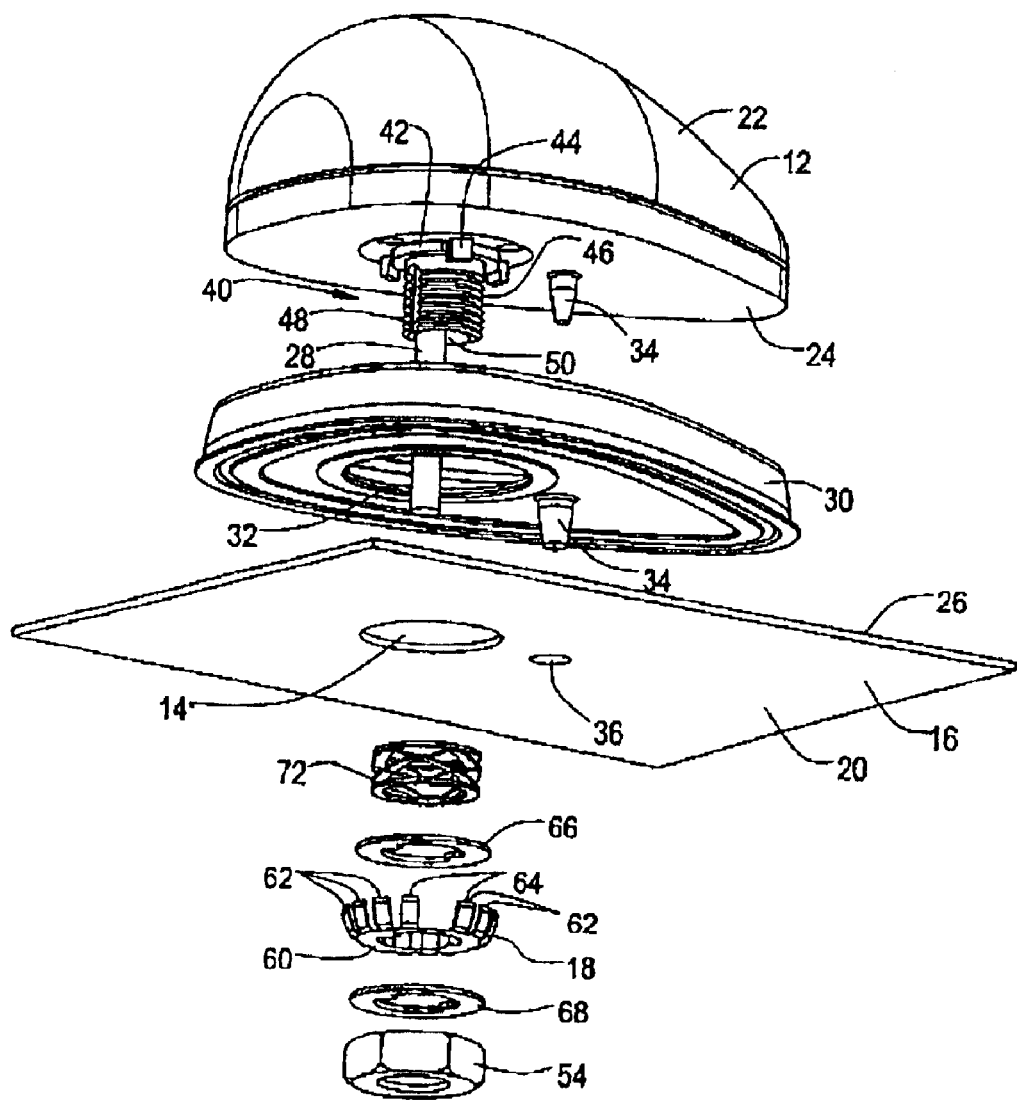
FIG. 2 is an exploded view of the attachment assembly and antenna unit of FIG. 1.
Figure 3:
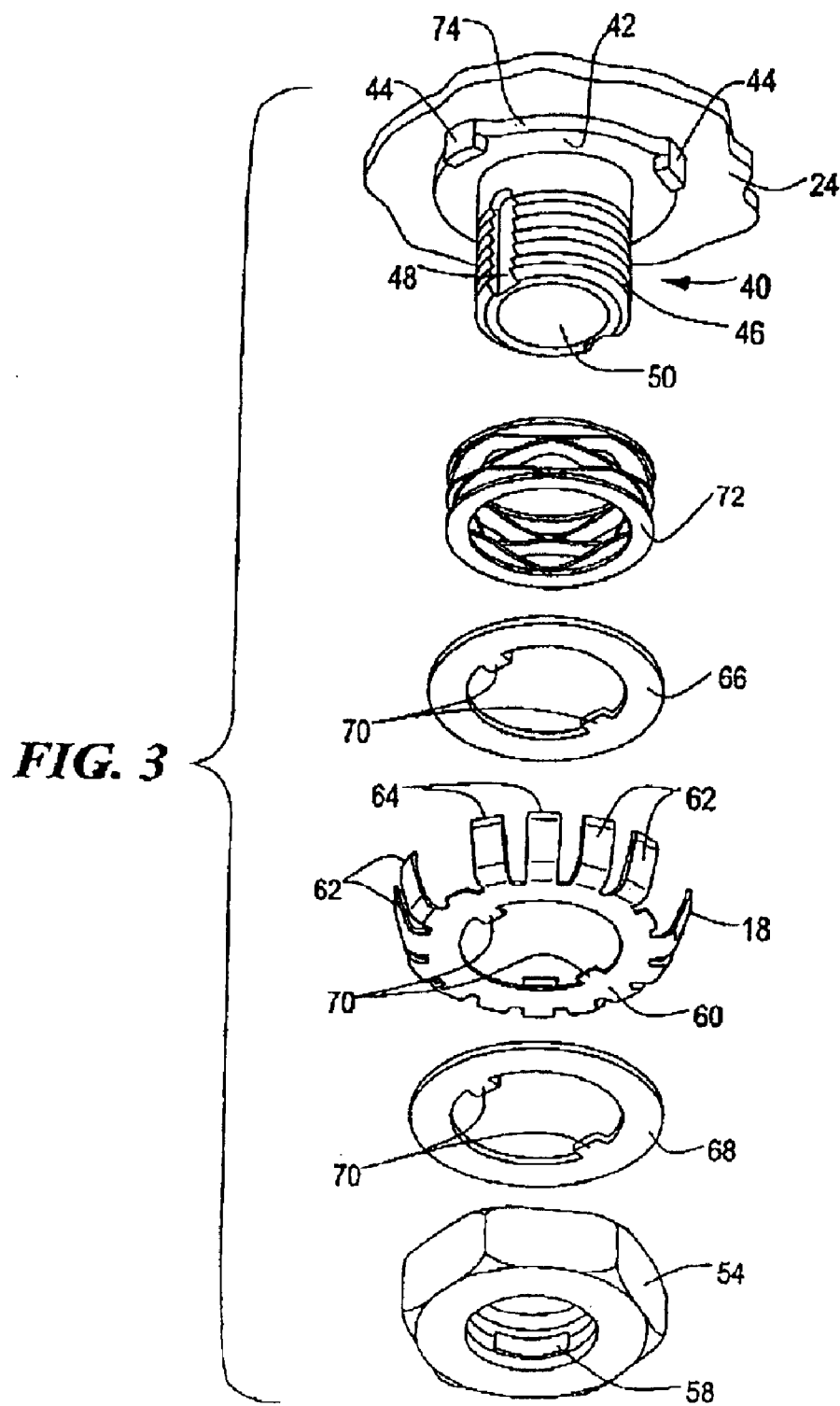
FIG. 3 is an exploded view of the attachment assembly of FIG. 1.
Figure 4:
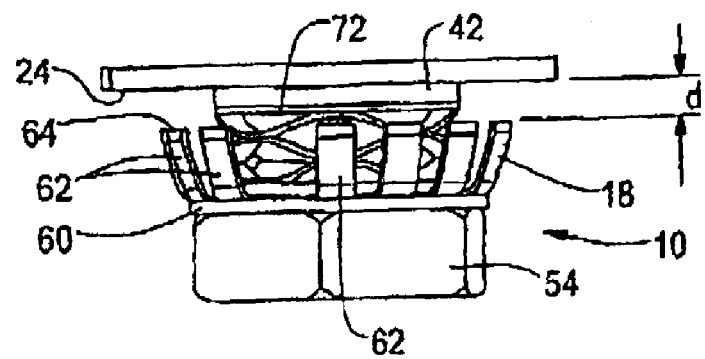
FIG. 4 is a side view of the attachment assembly of FIG. 1.
Figure 5:
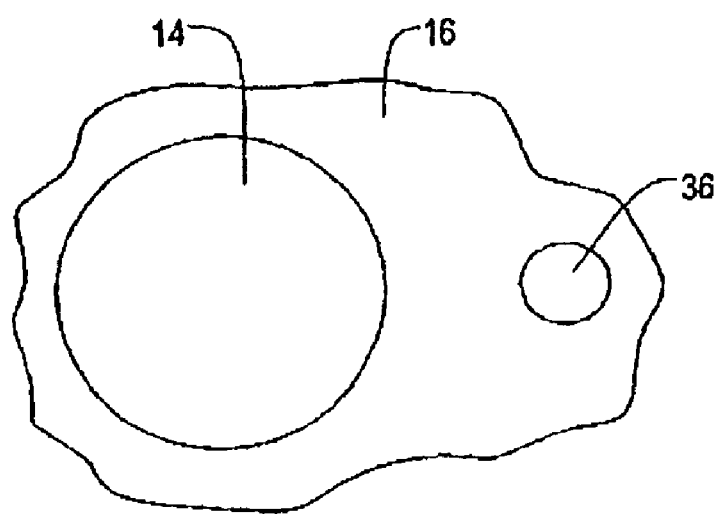
FIG. 5 is a cutaway plan view of a vehicle panel for use with the attachment assembly and antenna unit of FIG. 1.

Referring now to the drawings, and more particularly to FIGS. 1 through 11, there are shown various embodiments according to the present invention.

Generally, embodiments of the present invention illustrated herein comprise a gasket used in combination with an automotive antenna mounting system.

An antenna attachment assembly 10 according to a first embodiment of the present invention is illustrated more fully in FIGS. 1–5 in conjunction with an antenna unit 12. The attachment assembly 10 is fixed to and extends from the antenna unit 12 and extends through an opening 14 in a panel 16 of a vehicle body. The attachment assembly 10 includes an expandable member 18 that is biased against the interior surface 20 of the panel 16, thereby fixing the attachment assembly 10 and antenna unit 12 to the vehicle, as discussed further below.

In the illustrated embodiments, the antenna unit 12 is illustrated as a cover 22 for a GPS or satellite antenna. It will be appreciated that the attachment assembly of the present embodiment may be used with any type of antenna and associated cover or base unit, such as an AM/FM antenna, or with any other device or object that is intended to be affixed to a panel.

In the illustrated embodiment, the unit 12 has a lower surface 24 of the vehicle panel 16 over the opening 14 in the panel. A cable 28 from the unit 12 extends through the lower surface 24 of the unit and through the opening 14 in the panel 16 for connection to other components within the vehicle, as known in the art. A perimeter gasket 30 with an opening 32 therein fits between the lower surface 24 of the unit 12 and the exterior surface 26 of the panel 16. The gasket 30 seals the opening 14 against leaks and compensates for thickness and contour fluctuations in the panel 16. Keying features 34 extend from the unit 12 and the gasket 30 into a smaller opening 36 in the panel 16. Isolated views of the preferred embodiments of the gasket 30 are further illustrated in FIGS. 6–11.

In a first embodiment, the attachment assembly 10 includes a base assembly 40 that is fixed to and extends from the lower surface 24 of the antenna unit 12. The base assembly 40 includes a base plate 42 having a plurality of radially extending tabs 44 located about the circumference of the base plate 42. The tabs fit within the opening 14 in the panel 16. Three tabs 44 are suitable, although any desired number may be used. The base assembly 40 may be integral with or fixed to the unit 12 in any suitable manner, such as with screws or adhesive. The base assembly 40 also includes an externally threaded hollow shaft 46 extending downwardly from the base plate 42. The shaft includes one or more key slots 48 along its length, discussed further below. The cable 28 from the unit 12 passes through the hollow interior 50 of the shaft 46.

When installed on a vehicle, the base assembly 40 extends through the opening 14 in the panel 16. The expandable member 18, such as a snap ring, fits over the externally threaded shaft 46. A retaining member 54, such as an internally threaded jam nut, retains the expandable member 18 on the base assembly and biases the expandable member against the interior surface 20 of the panel 16. The nut preferably includes a self-locking fastener element 58, such as a polyester or nylon element, applied to the threads at an interior location to prevent slippage, as known in the art. The fastener element preferably does not impede engagement of the nut onto the threads of the shaft.

In the embodiment shown, the snap ring comprises an annular washer portion 60 and a plurality of upstanding, resilient members such as fingers 62 that, in the installed position, expand radially outwardly and at their tips 64 press against the interior surface 20 of the panel 16. The snap ring is preferably stamped and formed from a sheet material having a thickness, hardness, and other properties selected to provide an appropriate amount of resiliency to the fingers, as may be readily determined by those of ordinary skill in the art. A metal material, such as a 30 gauge stainless steel, is suitable, although an appropriate plastic or composite material may be used if desired. Preferably, a stability washer 66 is provided above and an anti-torsion washer 68 is provided below the annular washer portion 60 to stiffen and support the washer portion and protect the washer portion from distortion. Generally, the washers are stamped from a thicker sheet material than the snap ring, such as a 20 gage stainless steel. Both washers and the snap ring include one or more inwardly facing tabs or keys 70 that align with and fit within the key slots 48 on the threaded shaft 46. When fitted within the key slots, the keys prevent the expandable member 18 from rotating with respect to the unit 12.

The attachment assembly of the present embodiment also preferably includes a spacer member 72, such as a compression spring that allows for multiple preset distances to accommodate various panel thicknesses. The compression spring exerts a downward bias on the snap ring against the upward force exerted by the jam nut. The height of the compression spring is set by tightening the jam nut so as to achieve the desired distance or gap (d) between the top of the snap ring fingers and the base plate. Upon installation, the vehicle panel fits within this gap. If necessary, the size of the compression spring may be selected to achieve the desired gap size, depending on the thickness of the panel.

In the present embodiment, assembly requires a downward push of the antenna unit 12 and the attachment assembly 10 through the opening 14 in the panel 16. As the attachment assembly is inserted through the opening in the panel, the resilient fingers 62 of the snap ring compress radially inwardly. The tips 64 of the fingers extend within arcuate regions 74 between the tabs 44 of the base plate 42. Once the snap ring passes fully through the opening 14, the fingers spread radially outwardly. The tips of the fingers, which are preferably bent inwardly, abut against the interior surface 20 of the panel 16, thereby locking the attachment assembly in place. If necessary, any final adjustments can be made by rotating the jam nut.

The gasket 30 shown in FIG. 1 is disposed against the lower surface 24 of the antenna unit 12. The gasket 30 preferably seals the base assembly 40 to the panel 16. It is particularly desirable to employ a gasket in automotive applications or other applications where the exterior of the panel is exposed to the external environment. An exemplary shaped gasket 30 illustrated in FIGS. 6 and 9 may be employed for this purpose. When the attachment assembly disclosed herein is affixed to a panel 16, the gasket 30 is compressed between the panel 16 and the base assembly 40. The materials and design of the gasket 30 are preferably selected to permit such compression to occur, while providing for a continuous seal.

The gasket 30 of the present embodiment further includes a series of formed bumps 3 in the bottom 500, which allows for compression during the installation of the gasket 30 into the antenna mounting assembly and provides a seal to the external environment. Moreover, the gasket 30 in this embodiment is implemented in either a generally V-shaped or circular embodiment, to provide an aesthetically pleasing appearance on the vehicle and thereby accounts for different design contours of the mounting assembly.

The one-piece gasket 30 is mounted to the antenna assembly, resulting with a waterproof barrier for both the antenna itself and the mounting interface between the antenna and the vehicle. The gasket 30 is preferably molded from an elastomeric rubber of an appropriate durometer and has specific features insuring proper sealing. The features associated with the automobile interface are designed to absorb a limited amount of surface contour and still provide abundant and robust sealing capability. These features include a series of semicircular hollow protrusions 8, which follow the perimeter of the antenna base, a large mounting hole 32, and other features. These protrusions 8 act as surface O-rings and partially compress during mounting and retain pressure against the vehicle surface after installation. In a preferred embodiment, the extreme perimeter of the gasket 30 provides a generally V-shaped tapered appearance aesthetically blending the antenna to the vehicle. The feathered inner edge 4 of the gasket 30 extends slightly beyond the sealing features 2 insuring full contact with the vehicle providing a quality appearance as well as a dust and gross moisture barrier.

Figure 6:
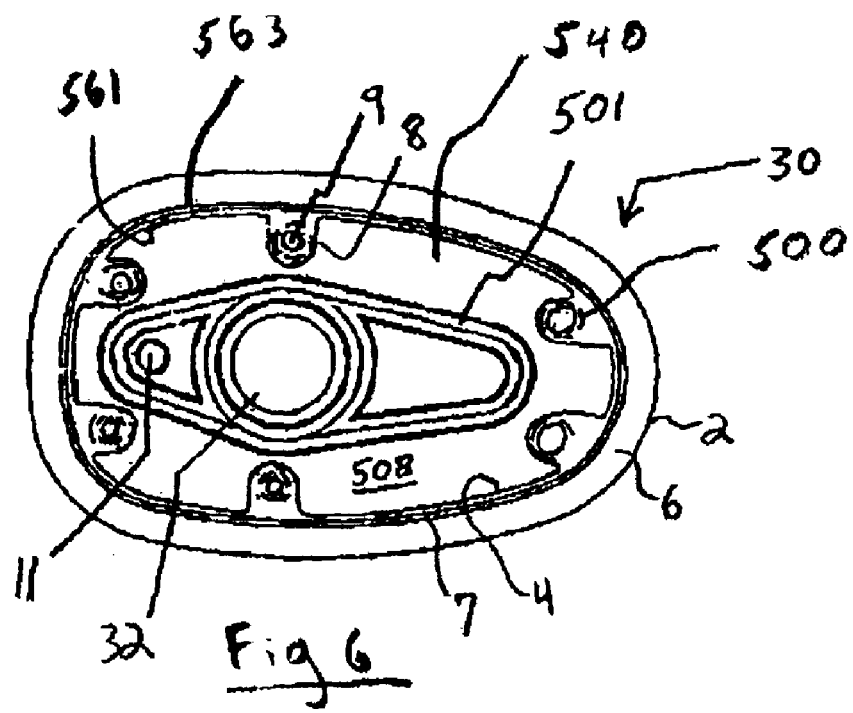
FIG. 6 is a top plan view of the gasket of FIG. 1.
Figure 7:
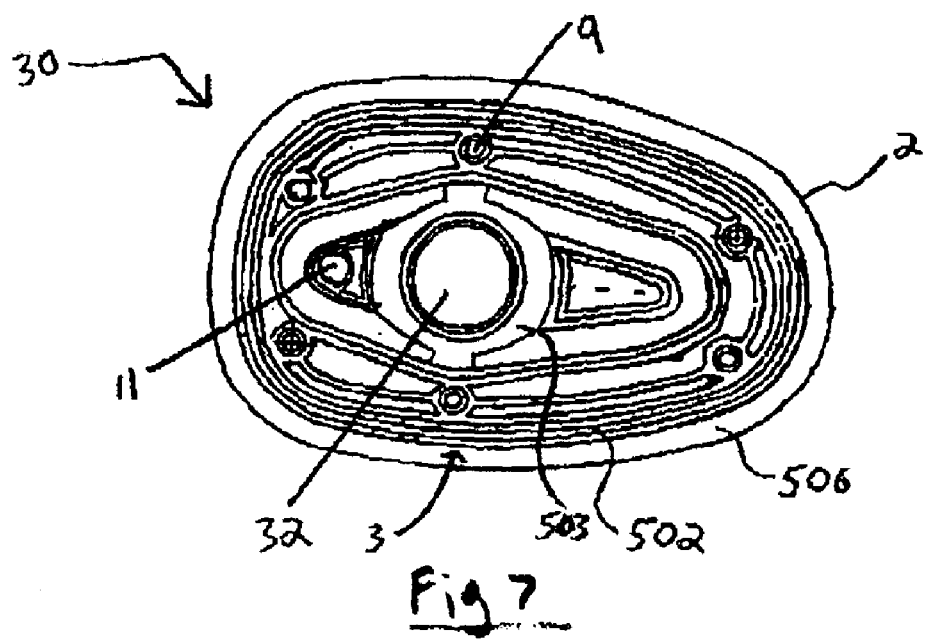
FIG. 7 is a bottom plan view of the gasket of FIG. 6.

The one-piece flexible gasket 30 in the present embodiment is used in combination with an antenna mounting assembly, as illustrated in FIGS. 6–7, wherein the gasket 30 comprises a base body 540 having a plurality of apertures 500 disposed therein. A mounting hole 32 capable of receiving the base assembly 40 as well as an anti-rotation hole 11 are further disposed in the base 540. The anti-rotation hole 11 aligns with the corresponding second opening 36 in the panel 16, wherein the keying features 34 attached to the lower surface 24 of the antenna unit 12 extend through the anti-rotation hole 11 and into the second opening 36 of the panel 16. An outer casing first wall 2 having a generally sloping outer surface 6 extending upward from the base 540 is included in the gasket 30, wherein the outer casing 2 further includes a generally planar inner surface.

The gasket 30 of the present embodiment further comprises an inner casing second wall 4 connected along a bottom portion of the outer casing 2, wherein the inner wall 4 surrounds the base body 540. A gap is positioned between the bottom portion of the inner casing 4 and the base 540. Moreover, a plurality of compressible ringed protrusion tabs 8 extending inwardly from the inner surface 507 of the inner casing 4 and having holes 9 aligned with the apertures (openings) 500 in the base 540 are included in the gasket 30. Additionally, a channel 7, embodied as a gap 7, is disposed in between the inner casing 4 and the outer casing 2. The gasket 30 further comprises a plurality of gripping members 3 disposed on the underside 6 of the base 540. These gripping members 3 are dimensioned and configured in a series of shallow 502 and deep 503 interface bumps, and function to seal the gasket 30 with a secondary surface 16. Furthermore, a sealing interface 501 is disposed on the upper surface 508 of the base 540, which function to provide a seal with the lower surface 24 of the antenna unit 12.

As illustrated in FIGS. 6–7, the inner casing 4 is positioned interior to the outer casing 2. Moreover, the gasket is generally V-shaped and composed of waterproof materials in its preferred embodiment. As best seen in FIG. 6, the upper portion 561 of the inner casing 4 vertically extends beyond the upper portion 563 of the outer casing 2.

An alternative embodiment of a gasket according to the present invention is illustrated in FIGS. 8–11, wherein a generally circular gasket 630 comprises a base portion 640 having an upper surface 608 and a lower surface 618. A sealing edge 602 extends from the base portion 640, wherein the sealing edge 640 includes a generally sloping outer surface 606 and an upper lip 605 positioned above the base portion 640. The upper lip 605 is configured to include a plurality of holes 609 spaced therethrough. The gasket 603 further includes an inner lip 624 extending from the base portion 640 and positioned below the upper lip 605, wherein the inner lip 624 is configured to include a plurality of apertures 600 spaced therethrough.

A slot 622 is configured between the upper lip 605 and the inner lip 624. Moreover, a mounting hole 632 is configured in the base portion 640 and is surrounded by a generally raised interface bump 601, which provides a sealing interface with a secondary surface, such as the antenna unit 12. The holes 609 in the upper lip 605 are positioned such that they are aligned over the apertures 600 in the inner lip. The gasket 630 further comprises a plurality of sealing interface members 603 located on the underside surface 618 of the base portion 640, wherein the sealing members 603 being dimensioned and configured to seal the gasket 630 with a secondary surface, such as the panel 16.

The gasket 630 also includes a preferably conical finger member 611 extending outwardly from the underside 608 of the base portion 640, wherein the finger member 611 is generally hollow. This conical finger member 611 functions as an anti-rotation member, which also seals off the smaller opening 36 in the panel 16. The finger member 611 is molded as part of the gasket 630, and drops down into the smaller opening 36 in the panel 16 upon installation. The keying features 34 attached to the lower surface 24 of the antenna unit 12 fit into the hollow finger member 611, which then extends into the second opening 36 of the panel 16 as indicated above. Upon installation, the keying features 34 expand the gasket 630 against the hole 36, thereby providing a secondary seal for the smaller opening 36

It will be recognized by those skilled in the art that changes may be made by the above-described embodiments of the invention without departing from the broad inventive concepts thereof. It is understood, therefore, that this invention is not limited to the particular embodiments disclosed, but it is intended to cover all modifications, which are within the scope and spirit of the invention as defined by the appended claims.

What is claimed is:

1. A one-piece flexible gasket used in combination with an antenna mounting assembly, said gasket comprising:
   a base having a plurality of apertures disposed therein;
   a plurality of holes disposed in said base;
   a generally sloped outer casing extending upward from said base;
   an inner casing connected along a bottom portion of said outer casing;
   a gap positioned between a bottom portion of said inner casing and said base;
   a plurality of ringed protrusions extending inwardly from said inner casing and aligned with said apertures in said base;
   a channel disposed in between said inner casing and said outer casing;
   a plurality of gripping members disposed on an underside of said base; and
   a sealing interface disposed on said base.

2. The gasket of claim 1, wherein said inner casing is positioned interior to said outer casing.

3. The gasket of claim 1, wherein said gasket is generally V-shaped.

4. The gasket of claim 1, wherein said gasket is waterproof.

5. The gasket of claim 1, wherein an upper portion of said inner casing extends beyond an upper portion of said outer casing.

6. The gasket of claim 1, wherein said ringed protrusions are compressible.

7. The gasket of claim 1, wherein said holes comprises an anti-rotation hole aligned with a corresponding hole attached to a secondary surface.

8. An automotive antenna mounting gasket comprising:
   a body having a plurality of openings disposed therein;
   a first wall surrounding said body;
   a second wall connected to said first wall, said second wall surrounding said body;
   a first gap formed between said first wall and said second wall;
   a mounting hole disposed in said body;
   a plurality of tabs extending inwardly from said second wall, wherein said tabs having holes disposed therein and aligned with said openings in said body;
   a second gap formed between said second wall and said body;
   a plurality of sealing interface members on said body, said sealing members being dimensioned and configured to seal said gasket with a secondary surface; and
   an anti-rotation member disposed in said body.

9. The gasket of claim 8, wherein said second wall is positioned interior to said first wall.

10. The gasket of claim 8, wherein said gasket is generally V-shaped.

11. The gasket of claim 8, wherein said gasket is waterproof.

12. The gasket of claim 8, wherein an upper portion of said second wall extends beyond an upper portion of said first wall.

13. The gasket of claim 8, wherein said tabs are compressible.

14. The gasket of claim 8, wherein said anti-rotation member comprises a hole aligned with a corresponding hole attached to said secondary surface.

15. A gasket comprising:
   a base portion;
   a sealing edge extending from said base portion and comprising an upper lip positioned above said base portion, said upper lip comprising a plurality of holes spaced therethrough;
   an inner lip positioned proximally to said sealing edge;
   a gap configured between said sealing edge and said inner lip;
   a mounting hole configured in said base portion;
   an anti-rotation member configured in said base portion;
   a plurality of holes disposed through said base portion; and
   a plurality of sealing members on said base portion, said sealing members being dimensioned and configured to seal said gasket with a secondary surface.

16. The gasket of claim 15, wherein said inner lip extending from said base portion and positioned below said upper lip, said inner lip having a plurality of apertures spaced therethrough.

17. The gasket of claim 16, further comprising a gap configured between said upper lip and said inner lip.

18. The gasket of claim 16, wherein said holes are aligned over said apertures.

19. The gasket of claim 15, wherein said anti-rotation member is a finger member extending from an underside of said base portion.

20. The gasket of claim 15, wherein said inner lip is positioned interior to said sealing edge.

21. The gasket of claim 15, wherein said gasket is generally V-shaped.

22. The gasket of claim 15, wherein said gasket is waterproof.

23. The gasket of claim 15, wherein an upper portion of said inner lip extends beyond an upper portion of said sealing edge.

24. The gasket of claim 15, wherein said anti-rotation rotation member comprises a hole, wherein said hole aligns with a corresponding hole attached to said secondary surface.

25. The gasket of claim 15, further comprising a slot formed between said inner lip and said base portion.

26. The gasket of claim 15, further comprising a plurality of tabs extending inwardly from said inner lip, wherein said tabs having apertures disposed therein and aligned with said holes in said base portion.

* * * * *